March 11, 1941.   L. H. DIEHL ET AL   2,234,625
OIL SEAL
Filed July 6, 1937

Inventors
Lloyd H. Diehl
George T. Balfe
Harry B. Denman

By Cushman Darby & Cushman
Attorneys

Patented Mar. 11, 1941

2,234,625

UNITED STATES PATENT OFFICE 2,234,625

OIL SEAL

Lloyd H. Diehl, George T. Balfe, and Harry B. Denman, Detroit, Mich., assignors to Detroit Gasket & Mfg. Co., Detroit, Mich., a corporation of Michigan Application July 6, 1937, Serial No. 152,220

2 Claims. (Cl. 288—8)

Our invention relates to an oil seal, the material for making the same and a method of manufacture. Particularly it concerns a laminated product having integrally joined homogeneous layers, one of a soft resilient material and the other of a bearing material which is relatively harder, but has appreciable characteristics of compression and rebound.

The seals are useful in the automotive industry for example, in connection with the rear axle and housing and in any other instance where a rotating shaft in combination with a bearing is employed and where it is desirable to prevent the lubricant from creeping along the shaft.

An object of the invention is to provide an oil seal of considerable strength having a relatively soft, resilient, outer surface layer or portion which has a high coefficient of friction and which will be resistant to the deteriorating influences of oil.

A further object of the invention is to provide an oil seal with an inner bearing layer which will be wear resistant and relatively harder than the outer compressible layer, but which will be somewhat resilient and will not interfere with the compressibility of the outer and more resilient layer.

Another object of the invention is to produce an oil seal with an inner layer which will be heat-insulating and capable of resisting the deteriorating action of heat, and the solvent and chemical effects of lubricants.

The invention aims also to produce an oil seal, the individual layers of which are homogeneous and are integrally and continuously bonded together in a homogeneous union along their contiguous surfaces forming a firm and permanent connection between the two layers without interfering with the resiliency and compressibility of the seal.

A further object of the invention is to provide an oil seal wherein the material thereof is resistant to the solvent and chemical effects of lubricants.

Another object of the invention is to provide a simple and efficient process of manufacturing oil seals and capable of being adapted to large scale production.

We have illustrated the invention in the drawings as being ring-shaped, but it will be appreciated that the configuration will vary, dependent upon the contour of the surfaces to be sealed, e. g., oval, oblong, etc. While the oil seal has been indicated as particularly useful in association with a rotating shaft, it is not so limited in application since there are numerous sealing conditions where the invention may be employed, as for instance, as a washer or gasket.

Figure 1:
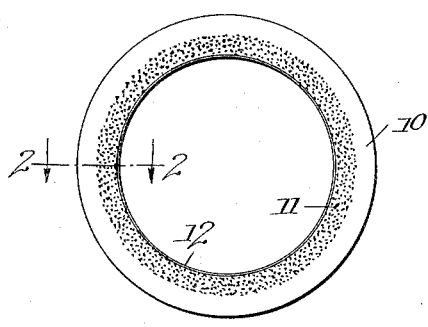
Figure 1 shows a plan view of the oil seal ring.

Referring to the drawing, the oil seal of this invention comprises a relatively soft, resilient, outer ring 10, the exposed surface of which has a high coefficient of friction. This ring is resistant to the solvent and deteriorating influence of lubricants and oils.

The material of which this outer ring is composed may be one of the synthetic rubbers such as "Neoprene," "Thiokol," or the synthetic plastic disclosed in Patent No. 2,067,465. Such synthetic rubbers and plastics are characterized in that they are highly resistant to oil and may be substituted fully for the nautral rubbers or they may be used in varying proportions with natural rubber. When natural rubber is combined with the synthetic rubber, the resultant composition will have considerable resistance to the deteriorating effects of lubricants and oils. Either a synthetic rubber or a compound of natural and synthetic rubber may be used, dependent on the conditions which the seal will encounter in use.

Although an oil-proofed outer ring, as just described, is preferred, we sometimes employ an outer ring wholly of natural rubber. In many instances there is not a high rotational speed of the shaft such as to throw the lubricant outwardly and where there is not a large quantity of lubricant present, there will be no tendency for the lubicant to be thrown or to work up onto the outer rubber ring and a natural rubber ring will be satisfactory.

Disposed within and concentric with the soft, resilient outer ring 10 is an inner ring or layer 11 composed of cork particles or granules bonded by a synthetic rubber of the type referred to above, or by a composition of natural and synthetic rubber. In some cases, this binder consists wholly of natural rubber, as where no considerable oil resistance is required.

The inner surface of the inner ring 11 has a smooth continuous film or skin coating 12 of the rubber material coextensive with the inner periphery of the ring and integral with the body of the ring. This skin may be formed by causing the rubber binder to bloom at the surface or may be produced by a coating upon the ring.

The two concentric rings are adhered to each other as shown to form an integral laminated structure, preferably by vulcanization of the rubber content. That is to say, vulcanization of the unvulcanized or partially vulcanized rubber at the meeting peripheral surfaces of the two layers forms an integral and homogeneous, continuous, union throughout the contiguous or abutting surfaces of the layers.

Figure 3:
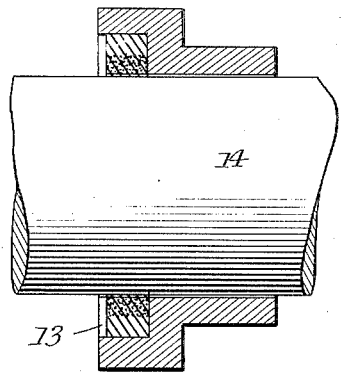
Figure 3 shows the ring seated in an annular recess of a shaft housing and a shaft projecting therethrough.

The oil seal of this invention is shown in Figure 3 by way of example seated in a recess 13 and encircling the shaft 14. Preferably the outside diameter of the oil seal ring is made slightly greater than the diameter of the recess 13 into which it is to be seated and the inside diameter is made slightly less than the diameter of the shaft 14 which the ring is to encircle. The resilient nature of the outer layer 10 of this ring permits its disposition in the recess 13, which is slightly smaller in diameter than the diameter of the ring, without reducing the diameter of the inner ring 11. Such a ring does not require a driving fit as is common in metallic rings, and has the advantage over the metal or rigid ring in that it may be easily inserted in place or removed therefrom. No special tools are necessary to position the ring in place, and it will remain seated even though there is considerable vibration. Such a ring will absorb considerable deformation from end thrust before it will be dislodged in contradistinction to a metallic or rigid ring which, if it gives at all, will not return.

The inner ring 11 being made slightly smaller in diameter than the diameter of the shaft 14 which it is to encircle, will provide a snug fit about the shaft and thereby prevent the lubricant or oil from creeping along the shaft. Further, this inner ring being composed of cork embodies the heat-insulating properties of the cork and is substantially resistant to heat transfer, so that the heat developed by the rotation of a high speed shaft or transmitted to the shaft will not be communicated to the outer rubber ring so as to cause its deterioration or softening. Furthermore, this cork rubber composition is considerably harder than the outer ring and is thus resistant to wear and forms a bearing surface. Although this inner ring is harder than the outer ring, it retains a considerable amount of resilience, i. e., the inner ring material possesses substantial compression and rebound characteristics which permits it to undergo deformation and a substantial amount of expansion. The inner surface of this inner ring is, as aforesaid, coated with a continuous film or skin 12 of rubber, which, when lubricated, provides a substantially frictionless surface.

Figure 4:
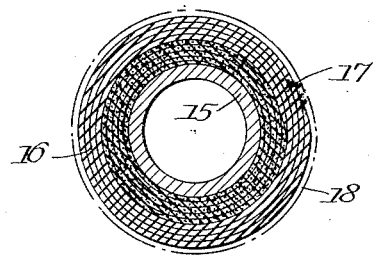
Figure 4 shows a section through the laminated sealing material from which the rings are formed and in an intermediate state.
Figure 5:
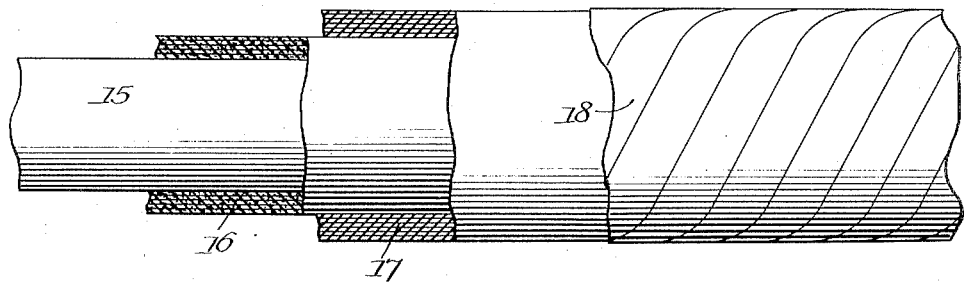
Figure 5 shows a preferred method of forming the sealing material.

Referring to Figures 4 and 5, a preferred method of manufacture consists in sheeting-out relatively thin layers or ribbons of the cork-rubber composition 11, and wrapping the same convolutely about a hollow steel mandrel 15 to form a core, as shown at 16. As one example, the sheet or ribbon will have a gauge of about 1/32nd of an inch and the wrapping will continue until the desired built-up thickness and outside diameter for the inner ring is secured. Thereupon, a sheet or ribbon of the rubber material 10 having a similar gauge, or varying in thickness from that of the cork-rubber sheet or ribbon is convolutely wound upon the core 16, as shown at 17, until a suitable thickness and outside diameter is obtained for the outer ring. It will be understood that the gauge of the sheets or ribbons 16 and 17 will be varied in accordance with the sealing material being produced and the use to which it is to be applied.

The rubber content of the convolutions of the respective materials is in an incompletely vulcanized or unvulcanized state and the intermediate product which is now ready for vulcanization has the appearance as shown in cross-section in Figure 4.

Figure 2:
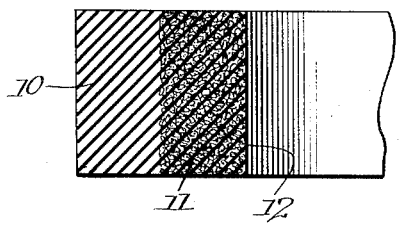
Figure 2 shows an enlarged cross-section of the ring on the line 2—2 of Figure 1, and showing the homogeneous layers of sealing material, integrally bonded by a homogeneous union.

Vulcanization is efficiently accomplished by confining the built-up structure in an outer wrapping of a non-elastic material, such as fabric 18, as shown in Figure 5, and subjecting the whole to suitable vulcanizing conditions, as well known. This vulcanization causes both (1) the rubber content of the convolutions of the respective layers 10 and 11, and (2) the rubber content of the adjacent convolutions at the contiguous peripheral surfaces of the concentric layers to combine and form an integral homogeneous bond. The final product is thus devoid of lines of jointure and the respective layers are formed into integral homogeneous bodies as shown in Figure 2.

Figure 6:
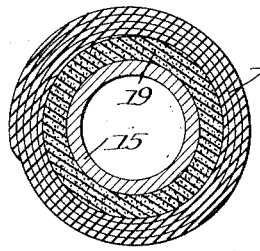
Figure 6 shows a modified method of forming the sealing material.

Referring to Figure 6, instead of wrapping the cork-rubber composition convolutely upon the mandrel 15, it is extruded in the form of a tube or core 19. This is slipped over the mandrel 15 and thereafter the sheeted rubber material 17 is convolutely wound over this core. The intermediate article has the appearance as shown in section in Figure 6. Vulcanization is now carried out as previously described to produce an integral union of the convolutions of the rubber and form a homogeneous body 10 and a similar integral and homogeneous union between the contiguous peripheral faces of the cork-rubber composition and the rubber, as shown in Figure 2 and as previously described in connection with the method illustrated in Figure 5.

After the vulcanization treatment, the tubular bodies shown in Figures 4, 5 and 6 are removed from the mandrel and severed to any desired thickness for forming oil seals.

It is to be understood that the forms of the invention shown and described are illustrative of preferred embodiments and that such changes may be made without departing from the spirit of the invention as fall within the purview of one skilled in the art and the scope of the appended claims.

The term "rubber-like" as used in the appended claims is intended to cover artificial or synthetic rubbers, mixtures thereof with natural rubber, and natural rubber.

We claim:

1. A sealing ring having concentric ring portions integrally united, the inner ring portion being hard, forming a bearing layer comprising an oil resistant synthetic rubber for contact with a shaft, and an outer ring portion being relatively more compressible and resilient and adapted to be inserted in a housing of slightly smaller diameter without substantially reducing the diameter of the inner ring portion but due to its greater resilience, acting to hold the inner ring portion in sealing contact with the shaft, said outer ring portion comprising rubber, one of said ring portions also including comminuted cork.

2. A sealing ring having concentric ring portions integrally united, the inner ring portion being hard, forming a bearing layer comprising an oil resistant synthetic rubber for contact with a shaft, and an outer ring portion being relatively more compressible and resilient and adapted to be inserted in a housing of slightly smaller diameter without substantially reducing the diameter of the inner ring portion but due to its greater resilience, acting to hold the inner ring portion in sealing contact with the shaft, said outer ring portion comprising rubber.

LLOYD H. DIEHL.
GEORGE T. BALFE.
HARRY B. DENMAN.